(12) United States Patent
Widess

(10) Patent No.: US 9,307,855 B2
(45) Date of Patent: Apr. 12, 2016

(54) CANE CLAMP FOR WALKING AIDES

(71) Applicant: Jim Widess, El Cerrito, CA (US)

(72) Inventor: Jim Widess, El Cerrito, CA (US)

(*) Notice: Subject to any disclaimer, the term of this patent is extended or adjusted under 35 U.S.C. 154(b) by 0 days.

(21) Appl. No.: 14/077,999

(22) Filed: Nov. 12, 2013

(65) Prior Publication Data
US 2015/0129740 A1 May 14, 2015

(51) Int. Cl.
F16M 13/00 (2006.01)
A47G 25/12 (2006.01)
F16M 13/02 (2006.01)
A61H 3/02 (2006.01)

(52) U.S. Cl.
CPC ............. *A47G 25/12* (2013.01); *F16M 13/022* (2013.01); *A61H 2003/0261* (2013.01)

(58) Field of Classification Search
CPC .............................. A47G 25/12; F16M 13/022
USPC ......... 248/514, 518, 682, 689, 690, 534, 535, 248/539, 218.4
See application file for complete search history.

(56) References Cited

U.S. PATENT DOCUMENTS

| 4,300,742 | A | * | 11/1981 | Hunn | 248/689 |
| 4,605,190 | A | * | 8/1986 | Kamp | 248/316.7 |
| 6,311,942 | B1 | * | 11/2001 | Rotter et al. | 248/316.5 |
| 6,547,112 | B2 | * | 4/2003 | Gallagher et al. | 224/407 |
| 7,021,324 | B1 | * | 4/2006 | Clay et al. | 135/67 |
| 7,422,188 | B1 | * | 9/2008 | Schlosser | 248/535 |
| 7,850,140 | B2 | * | 12/2010 | Jacobs et al. | 248/689 |
| 2005/0035251 | A1 | * | 2/2005 | Wallin | 248/230.1 |
| 2005/0098695 | A1 | * | 5/2005 | Hollenbeck | 248/229.26 |
| 2009/0072103 | A1 | * | 3/2009 | Cramer | 248/218.4 |
| 2009/0072105 | A1 | * | 3/2009 | Cramer | 248/226.11 |

* cited by examiner

Primary Examiner — Mark Wendell
(74) Attorney, Agent, or Firm — Michael L. Greenberg, Esq.; Greenberg & Lieberman, LLC

(57) ABSTRACT

The cane clamp is a device for securely clamping a walking cane to a table, chair or any conventional, sturdy surface that is up to five inches thick. The cane clamp consists of a body configured to securely hold a tubular device such as a walking cane, a bracket which provides two planar contacts to a projecting surface, and a constant force spring which provides a third planar contact to a projecting surface. The end of the constant force spring is attached between the body and the bracket, and may be opened easily by a user, preferably with a single finger.

15 Claims, 5 Drawing Sheets

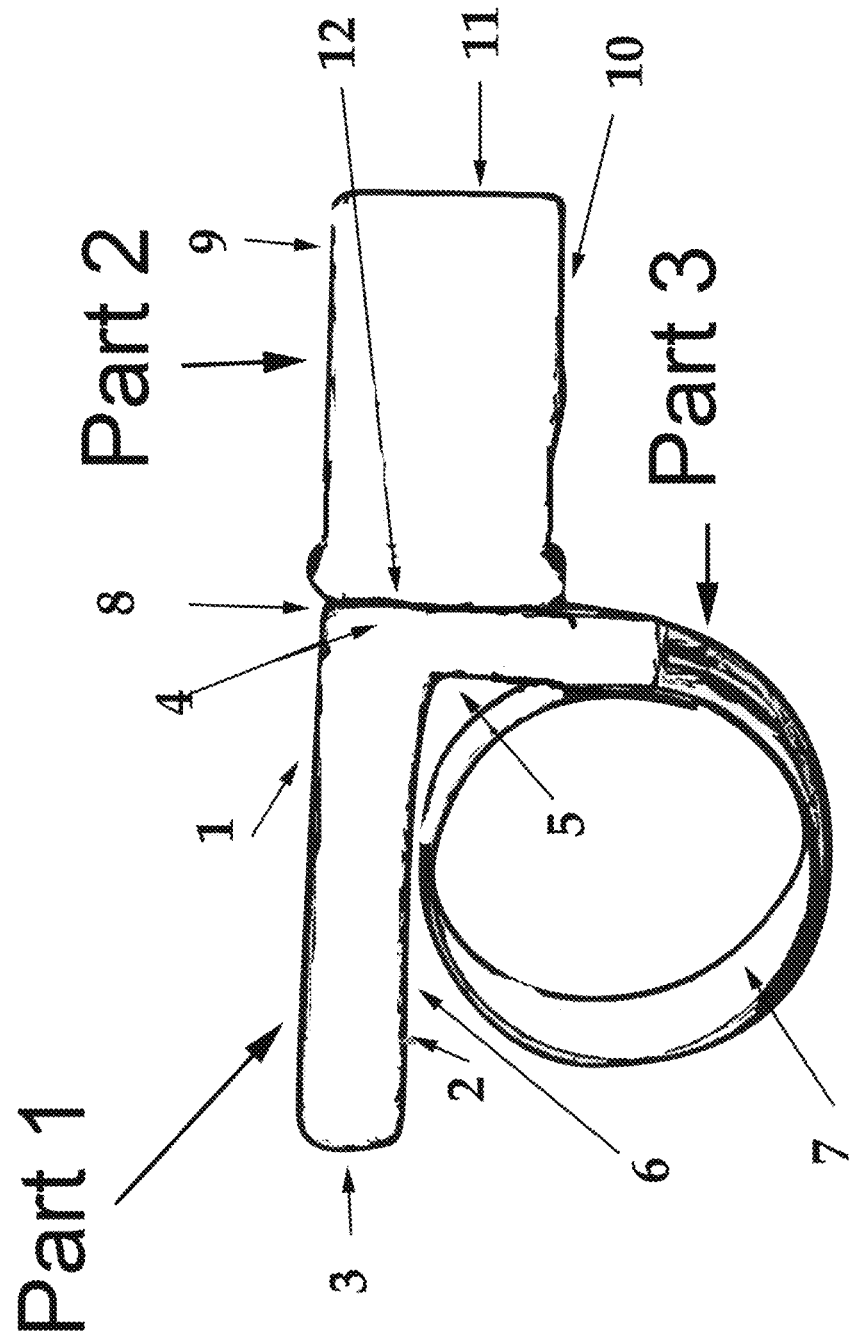

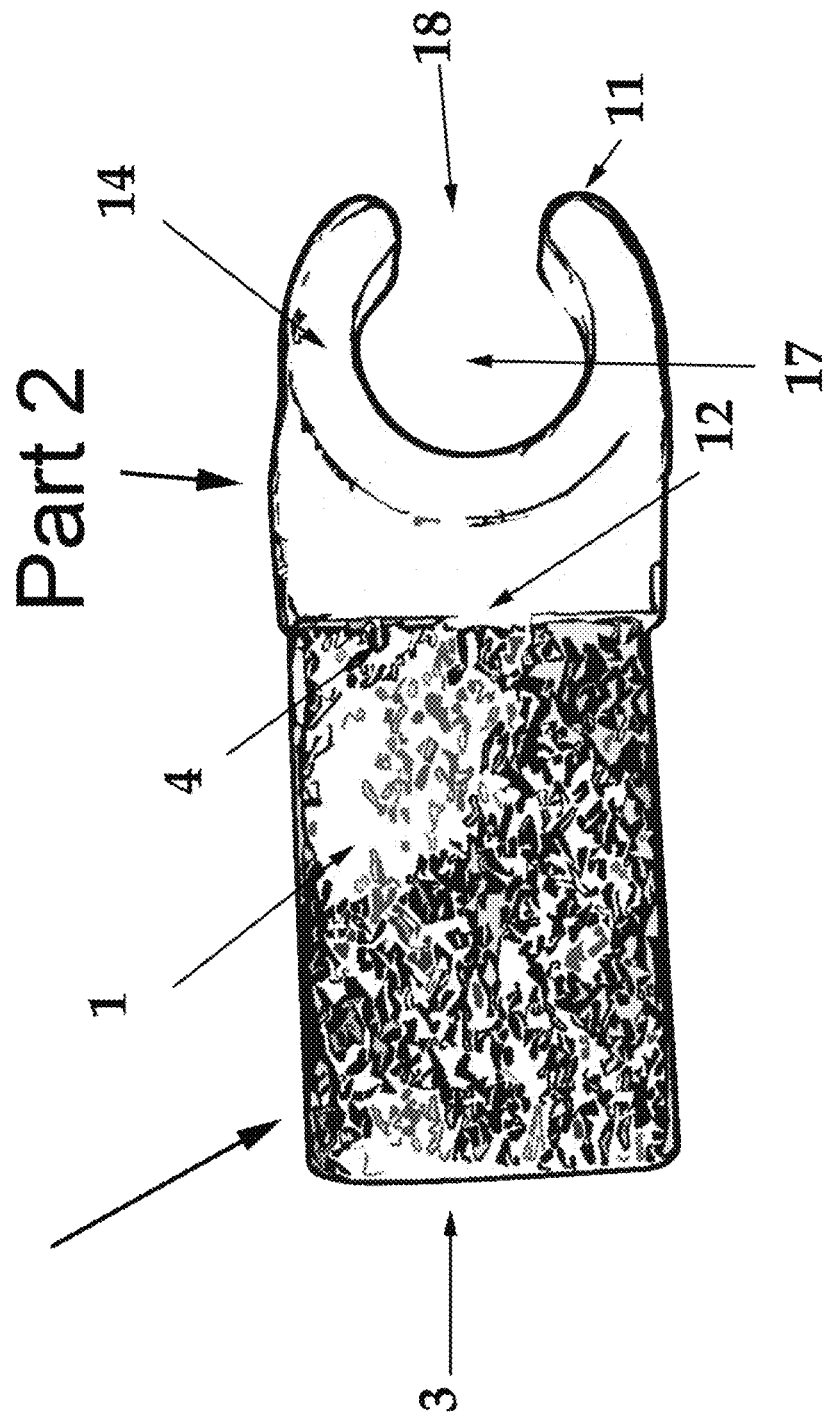

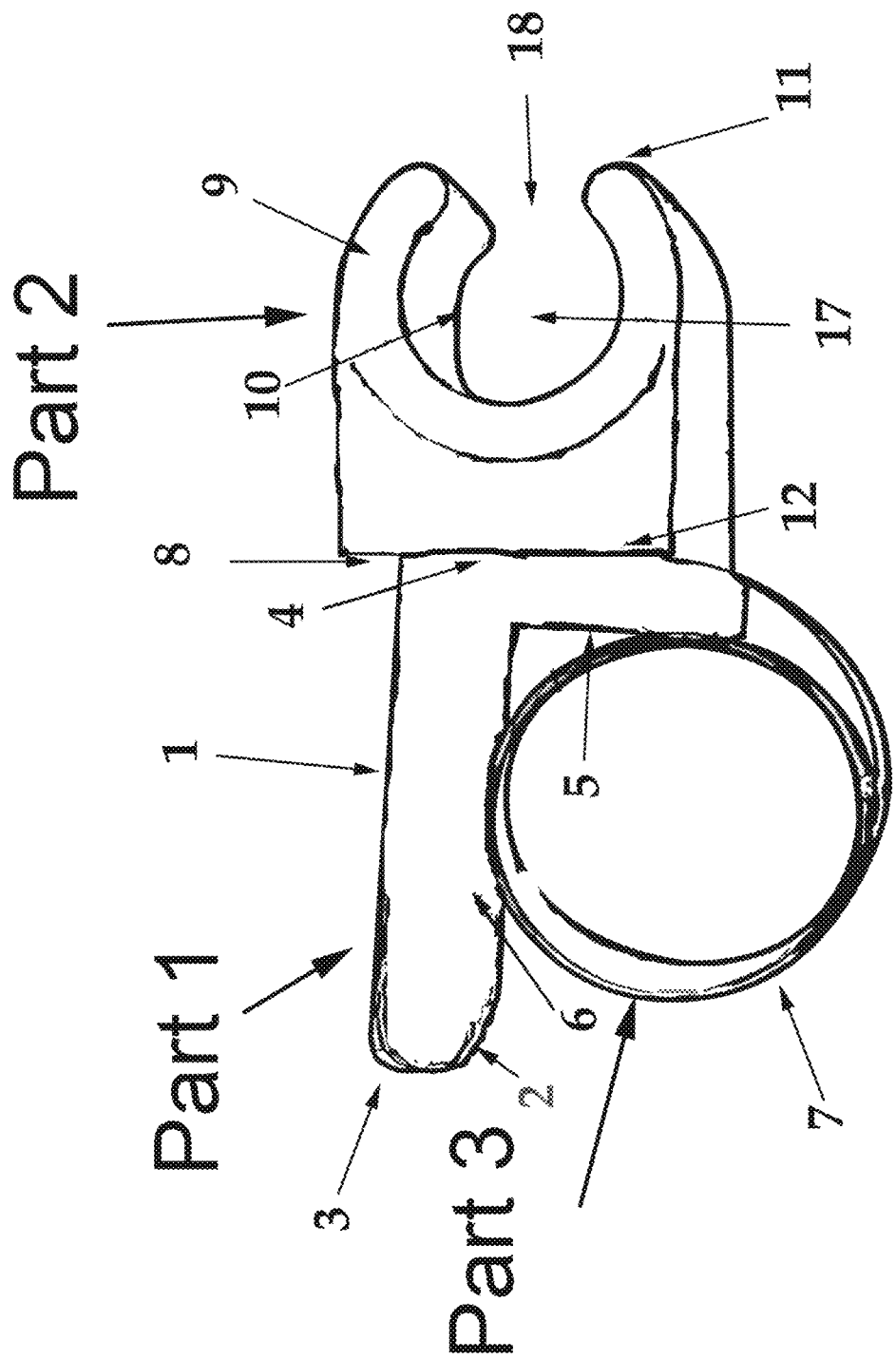

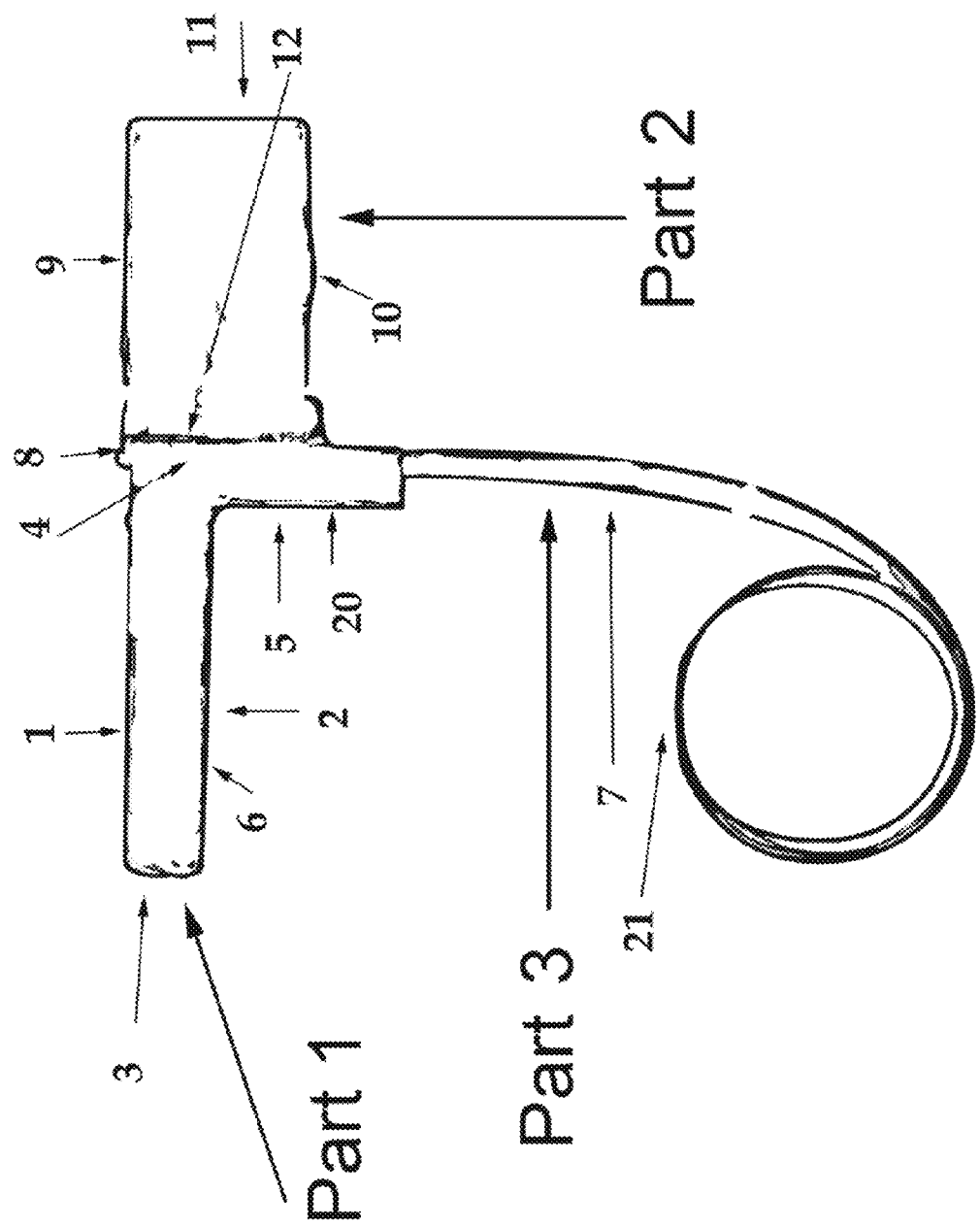

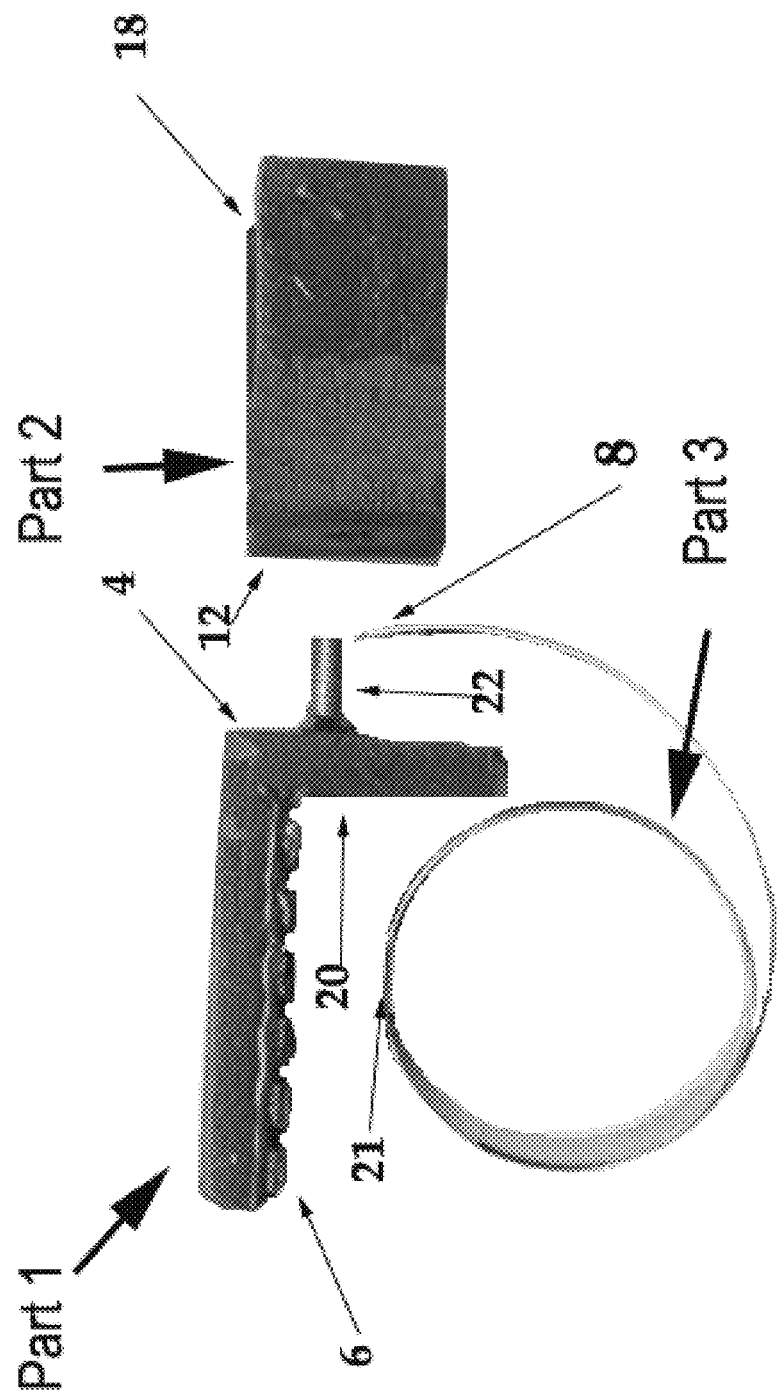

CANE CLAMP FOR WALKING AIDES

FIELD OF THE PRESENT INVENTION

The present invention relates retaining devices, and more specifically a retaining device designed to hold walking canes conventionally fashioned to aide walking, and more specifically, related to devices designed to assist a user who is handicapped, injured, or elderly.

BACKGROUND OF THE PRESENT INVENTION

Those of us who need walking canes for help with balance when upright frequently find times when one must set the walking cane aside: when sitting at a table, having to search through a purse or pocket, when conducting business while standing at a counter and both hands are involved in taking care of business, using the lavatory, etc. What does one do with his/her walking cane at those times? Leaning the cane against a wall, table or chair usually results in the cane being knocked over resulting in an embarrassing clatter and safety hazard. Laying the cane on the floor is a potential safety hazard for tripping as well as acquiring disease producing germs and viruses. The walking cane can also be forgotten if not readily visible.

Thus, there is a need for an invention that is small, unobtrusive and portable which effortlessly attaches to the walking cane and easily and securely clamps to the edge of the table or counter, leg or back of a chair or any vertical, diagonal or horizontal projection up to five inches thick. The invention should be easily manipulated by a man, woman or child without causing injury, and should keep the walking cane firmly in position even if jostled, bumped or kicked. The invention should accommodate at least 95% of all walking canes available to disabled people.

The two commercially popular portable cane holders rely on a device, attached to the cane, which balances the cane on the tabletop using the cane's center of gravity:
1. A pointed cylinder which encircle the cane and balances on the edge of the table, relying on the cane's center-of-gravity.—Patent Des 418,286
2. A cantilevered ledge which balances on the edge of the table or applies pressure against the underside of the table. US2011/0017,901 A1, US2005/0035,251 A1
Neither method truly secures the cane to the table. Their use can result in an embarrassing clatter when the cane is easily knocked from its position by design or accident. If two devices are used on either side of the projecting surface the clamping result is only as strong as the user is able to squeeze the two devices together.
Other devices which are meant to secure a walking cane do so by attaching to:
1. Edge of a Table
    A. by means of a C-clamp style fixture with an awkward thumb screw which is difficult to operate with an arthritic hand or fingers.
    B. by means of a "Small plastic fitting, mounts on a cane to hold it on a table edge when not in use. It snaps onto the cane and slides up or down to contact the top or bottom of the table. Best when used in pairs to contact both the bottom and top of a table. Small rubber band (included) placed around the end hooks maintains a secure grip on the cane shaft." From sales literature. Clamping pressure is what the user can physically achieve by manually squeezing the two plastic fittings together.
2. Leg of a table or chair—the angle and dimensions of the legs of chairs and tables vary tremendously and table legs are often set far back from the edge making their use as a securing post inconvenient or impossible because most walking canes are longer than table legs. If the device swivels on a table leg, the danger of tripping is increased.
3. User's body by means of a lanyard around the neck, a wrist band, a chain connected to an article of clothing, a spring loaded reel attached to the belt—in order to be able to retrieve a fallen cane without having to bend over and pick it up. These inventions do not prevent the cane from lying on the floor which poses safety and health hazards.

RELATED PATENTS

Related patents all purport to hold a walking cane against a table and protect the cane from falling. I believe they all fail in this stated objective because of one or more of the following reasons:
(1) they do not actually secure the walking cane to the table.
(2) the number of steps and the difficulty of the procedures required to achieve the objective is unreasonable.
(3) the maximum opening of the of the device is limited to only little more than an inch.
(4) the parallel jaws of the device do not adequately accommodate varied shapes of projecting surfaces
(5) more than one hand is required to secure the device to the projecting surface.

Conversely, the present invention is configured to be opened with one hand through a minimal amount of distinct steps, and may accommodate multiple types and shapes of projecting surfaces, including those preferably up to five inches thick. Likewise, the preferred embodiment of the present invention is explicitly configured to securely hold and maintain a cane or other pole or tube-shaped object in a user-selected position for extended periods of time.

SUMMARY OF THE PRESENT INVENTION

The present invention is a portable, one-hand operable, quick-release clamping device which is preferably configured to hold an elongated cylindrical object such as a walking cane or a tubular object in a fixed position while attached to a table, counter or other projecting surface up to five inches thick. The present invention is temporarily or permanently attached to the walking cane itself via a flexible pole clip, which partially wraps around the tubular member and can preferably accommodate a ¾" to a 1" diameter shaft. By changing the pole clip, larger or smaller diameter tubular members (larger or smaller walking sticks) may be attached. The pole clip is preferably affixed to a right angle bracket. The underside of the horizontal arm of the right angle bracket has a deformable pad to increase attraction between the projecting surface and the right angle bracket while the inside of the vertical arm of the right angle bracket is attached to a constant force spring which applies clamping pressure to the underside of the projecting surface. The section of the constant force spring which is in contact with the underside of the table can be laminated with a deformable pad to create more effective gripping surface. The space located between the top of the constant force spring and the underside of the projecting surface can preferably vary from ½" to 5," and can still provide sufficient clamping force to maintain the bracket fixed to the projecting surface. The present invention can also be used to hold a signpost vertically above a table or any other surface, vertical, diagonal or horizontal.

The patent application is for an original invention for use as a Portable, One-Hand Operable, Quick-Release, Tabletop Walking-Cane Clamp Using a Constant Force Spring.

BRIEF DESCRIPTION OF THE DRAWINGS

FIG. 1 is a profile view of the cane clamp without a cane showing the unique use of the constant force spring (Part 3) in the resting position.

FIG. 2 is a top or plan view of the cane clamp without a cane.

FIG. 3 is a profile view of the cane clamp without a cane showing Part 2 rotated 90 degrees in reference to Part 1. Part 2 is in the correct position for holding a walking cane when attaching the cane clamp to a vertical projecting surface.

FIG. 4 is a profile view of the cane clamp without a cane showing the unique use of the constant force spring (Part 3) stretched in the open position to accommodate a projecting surface of a thickness of up to 5 inches FIG. 5 displays the three primary parts of the preferred embodiment of the invention in an exploded view.

DESCRIPTION OF THE PREFERRED EMBODIMENT OF THE PRESENT INVENTION

The present invention is a retaining clamp for a cane or other tube or pole-based object. As depicted in FIG. 1, part 1, the present invention is equipped with a right angle bracket with an upper surface, 1, a lower surface 2, a front edge, 3, and a rear edge, 4, with an elongated perpendicular surface, 5. The lower surface, 2, has a deformable surface, 6, to better engage the projecting surface and provide additional grip. Part 2 depicts a body of the present invention, designed for holding the cane. Part 2 has an upper surface 9, a lower surface, 10, a front edge, 11, and a rear edge, 12. Part 2, as oriented in FIG. 1 is in the correct position for holding a walking cane when attaching the cane clamp to a horizontal projecting surface. Part 3 of FIG. 1 also shows the constant force spring in its resting or coiled state, 7.

To operate the cane clamp, the user's finger is inserted into the center of the constant force spring (Part 3) and a gentle downward pressure is applied to the lower part of the spring to increase the distance between the spring and the right angle bracket (Part 1). When this force is applied via the finger of the user, the clamp of the present invention opens, providing for the installation or removal of the clamp to/from a stable surface. A cane or other pole or tubular object may then be held in place by the present invention stably until needed.

The preferred embodiment of the present invention includes the addition of an optional split ring, which can be attached to the constant force spring (Part 3). The split ring is used to pull the constant force spring (Part 3) in order to open the space between the spring (Part 3) and the underside of the bracket (Part 1). The open clamp is configured to be slipped around the top edge of a table until the elongated perpendicular surface of Part 1 is against the edge of the table.

To release the cane clamp from the table, simply repeat the above instructions and slide the clamp away from the underside of the table. There is no reason to remove the clamp from the walking cane.

The constant force spring of the present invention is configured to provide a constant force against the projecting surface. The distance between the face of the right angle bracket and the surface of the constant force spring is irrelevant to the force applied. The preferred embodiment of the constant force spring clamp comprises one end of the constant force spring secured to a single face, the expanded coil of the spring and the horizontal face of the right angle bracket.

Additionally, the constant force spring of the present invention is preferably coiled at one end, and is movable along said spring from a point attached to the vertical face of the right angle bracket in a manner permitting the spring to move in a parallel relationship transverse to the portion of said spring which passes between them in a manner permitting said device to close with no gap between said spring and the horizontal face of the right angle bracket.

FIG. 2 more clearly depicts the slot of the present invention. As seen in FIG. 2, Part 3 is preferably located directly below Parts 1 and 2 and therefore is not visible in the plan view. The upper surface of Part 1, 1, the front edge, 3, and the rear edge, 4 are all visible from the perspective portrayed in FIG. 2. Also visible is the front edge 11 and the rear edge, 12 of Part 2. The opening, 17, in Part 2 is for receiving the walking cane and the slot, 18, in Part 2 is for inserting the cane into the opening, 17.

Additionally, as can be seen in FIG. 3, Part 1 has an upper surface, 1, a lower surface, 2, with a deformable surface, 6, a front edge, 3, and a rear edge, 4, with an elongated perpendicular surface, 5, for bearing against an edge of a projecting surface. The constant force spring, 7, is in the resting or coiled position. The rotated Part 2 has an upper surface 9, a lower surface, 10, a front edge, 11, and a rear edge, 12. The opening, 17, for receiving the walking cane and the slot, 18, for inserting the walking cane are clearly visible in this drawing. The end of the constant force spring, 8, is preferably located between Part 1 and Part 2, as seen in FIGS. 2-3.

As depicted in FIG. 4, the present invention preferably employs a total of three planar contact points with the projecting surface—the surface to which the cane clamp of the present invention is to be mounted. In order for the cane clamp to securely hold to the projecting surface, the cane clamp must have a minimum of three separate planar contacts with the projecting surface. Part 1 is placed on the projecting surface, such as a table top, with the lower surface, 2, firmly in contact with the table top and the deformable surface, 6, (first planar contact). Depending upon the contour of the edge of the table top, either all of the elongated perpendicular surface, 5, or a portion of the bearing surface, 20, (second planar contact) is in contact with the projecting edge of the table top. The closed coil at the moveable end of the constant force spring, 21, provides the third planar contact.

As seen in FIG. 5, the deformable surface, 6, of Part 1 is the first planar surface in contact with the projecting surface, for example the table top. The bearing side, 20, of the perpendicular surface is the usual second planar surface in contact with the edge of the projecting surface, for example the edge of the table top. The top of the coil, 21, of Part 3, the constant force spring, is the third planar surface in contact with the third side of the projecting surface, for example the underside of the table top. FIG. 5 also shows the rear edge, 4, of Part 1 which along with the rear edge, 12, of Part 2 is obscured in FIGS. 1-4, as is also the end, 8, of the constant force spring. The slot, 18, is also visible in FIG. 5. The joining device, 22, passes through the perpendicular surface of Part 1, through the hole in the end, 8, of Part 3 and into the rear edge, 12, of Part 2 where it is secured. The three parts being separate, Part 2 is able to pivot in relation to Part 1. In this embodiment of the invention, a machine screw, 22, is the joining device with a matching locking nut secured in the rear edge of Part 2. In other embodiments of this invention other joining devices could be used and are not precluded from use with this invention.

The present invention achieves the objective using a constant force spring as the clamping apparatus and requires only minimal finger pressure to open the mechanism and fix it to or release it from the table or other projecting surface of any shape or thickness up to 5 inches.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

I claim:

1. A cane clamp for temporarily holding a walking cane on a generally planar surface comprising:
   a unitary part comprising:
      a right-angle bracket, said right-angle bracket is equipped with the following: an upper surface, a lower surface, a front edge, a rear edge;
   and an elongated perpendicular surface;
      a constant-force spring;
      a body;
   wherein said lower surface has a deformable surface;
   wherein said constant-force spring is disposed between said body and said right angle bracket;
   wherein said constant-force spring supplies a binding force against said deformable surface of said right-angle bracket and said elongated perpendicular surface of said right-angle bracket; and
   wherein said body has an opening configured to hold a cane.

2. The device of claim 1, wherein said opening is circular in shape.

3. The device of claim 1, wherein said body has a slot extending through a front edge of said opening so that a portion of said cane is inserted and removed from the opening through the slot.

4. The device of claim 1, wherein said lower surface is coated or laminated with a deformable surface.

5. The device of claim 4, wherein said deformable surface is selected from the following group: foam, insulation, padding, tape, injection molding.

6. The device of claim 5, further comprising:
   a bearing side, said bearing side disposed on said perpendicular surface; and
   wherein said perpendicular surface is adapted for bearing against a projecting support surface via said bearing side.

7. The device of claim 6, wherein said rear edge is substantially pointed.

8. The device of claim 5, wherein said front edge extends away from said lower surface for a distance shorter than the diameter of said cane.

9. The device of claim 5, wherein said body can be pivoted on a 360 degree axis through the center of said front edge, center of said opening and center of rear edge.

10. The device of claim 4, wherein a coil of said constant-force spring is disposed against said lower surface.

11. The device of claim 1, wherein said front edge extends below said upper surface and said lower surface to form a perpendicular surface which is perpendicular to said lower surface.

12. The device of claim 11, wherein said rear edge is substantially flat.

13. The device of claim 11, wherein said rear edge is substantially concave.

14. The device of claim 11, wherein said rear edge is substantially convex.

15. The device of claim 11, wherein said constant force spring is attached to said bearing side of said perpendicular surface.

* * * * *